(12) United States Patent
Cook et al.

(10) Patent No.: US 11,224,778 B2
(45) Date of Patent: Jan. 18, 2022

(54) ISOKINETIC OSCILLATION EXERCISE DEVICE AND METHOD OF PRODUCING SAME

(71) Applicant: Mad Dogg Athletics, Inc., Venice, CA (US)

(72) Inventors: John Cook, Venice, CA (US); Bruce Hymanson, Manhattan Beach, CA (US)

( * ) Notice: Subject to any disclaimer, the term of this patent is extended or adjusted under 35 U.S.C. 154(b) by 60 days.

(21) Appl. No.: 15/643,320

(22) Filed: Jul. 6, 2017

(65) Prior Publication Data
US 2018/0008859 A1    Jan. 11, 2018

Related U.S. Application Data

(60) Provisional application No. 62/360,270, filed on Jul. 8, 2016.

(51) Int. Cl.
*A63B 23/12* (2006.01)
*A63B 21/00* (2006.01)
(Continued)

(52) U.S. Cl.
CPC ........ *A63B 21/027* (2013.01); *A63B 21/0004* (2013.01); *A63B 21/045* (2013.01);
(Continued)

(58) Field of Classification Search
CPC . A63B 21/027; A63B 26/003; A63B 71/0622; A63B 21/0004; A63B 21/4035; A63B 24/0062; A63B 21/075; A63B 21/0728; A63B 21/0724; A63B 21/045; A63B 23/12; A63B 21/06; A63B 2230/75;
(Continued)

(56) References Cited

U.S. PATENT DOCUMENTS

| 405,128 A | * | 6/1889 | Stockburger | ....... A63B 21/0724 482/106 |
| 2,803,087 A | * | 8/1957 | Zalkind | ................ A63H 33/009 446/473 |

(Continued)

OTHER PUBLICATIONS

"Bodyblade: Rapid Contraction Technology through Vibration, Apr. 8, 2012, https://bodyblade.com/" (Year: 2012).*

*Primary Examiner* — Sundhara M Ganesan
*Assistant Examiner* — Shila Jalalzadeh Abyaneh
(74) *Attorney, Agent, or Firm* — WPAT Law, P.C.; Anthony King

(57) ABSTRACT

An isokinetic oscillation exercise device of an elongated flexible blade having a first and second end and a grip portion coupled to a middle portion of the elongated flexible blade. End caps coupled to said first and second ends adapted to storage. Further, a method is disclosed of manufacturing an isokinetic oscillation exercise device that provides a flexible elongated flexible blade, a grip portion injection molding, a pliable ring injection moldings, and end caps injection molding; slides the pliable rings on the elongated flexible blade separated by a length of the grip portion, overmolds a first-shot of the grip portion over the pliable rings, overmolds a second-shot of the grip portion to the first-shot of the grip portion to the elongated flexible blade, seals the first-shot to the second-shot of the grip portion against the pliable rings; and attaches the end caps to the elongated flexible blade.

2 Claims, 14 Drawing Sheets

(51) Int. Cl.
| | |
|---|---|
| A63B 21/075 | (2006.01) |
| B29L 31/52 | (2006.01) |
| A63B 21/06 | (2006.01) |
| A63B 21/02 | (2006.01) |
| A63B 21/045 | (2006.01) |
| A63B 21/072 | (2006.01) |
| A63B 71/06 | (2006.01) |
| A63B 24/00 | (2006.01) |
| B29C 45/14 | (2006.01) |
| A63B 26/00 | (2006.01) |
| A63B 23/035 | (2006.01) |
| B29C 45/16 | (2006.01) |
| B29K 21/00 | (2006.01) |
| B29K 105/00 | (2006.01) |
| A63B 22/00 | (2006.01) |

(52) U.S. Cl.
CPC ........ *A63B 21/075* (2013.01); *A63B 21/0724* (2013.01); *A63B 21/0728* (2013.01); *A63B 21/4035* (2015.10); *A63B 23/12* (2013.01); *A63B 24/0062* (2013.01); *A63B 26/003* (2013.01); *A63B 71/0622* (2013.01); *B29C 45/14467* (2013.01); *A63B 21/06* (2013.01); *A63B 21/072* (2013.01); *A63B 23/03508* (2013.01); *A63B 23/03525* (2013.01); *A63B 2022/0092* (2013.01); *A63B 2071/0625* (2013.01); *A63B 2071/0655* (2013.01); *A63B 2071/0675* (2013.01); *A63B 2071/0694* (2013.01); *A63B 2210/50* (2013.01); *A63B 2210/58* (2013.01); *A63B 2220/17* (2013.01); *A63B 2220/51* (2013.01); *A63B 2220/64* (2013.01); *A63B 2220/806* (2013.01); *A63B 2220/807* (2013.01); *A63B 2220/833* (2013.01); *A63B 2225/093* (2013.01); *A63B 2225/50* (2013.01); *A63B 2225/54* (2013.01); *A63B 2225/74* (2020.08); *A63B 2230/75* (2013.01); *B29C 45/14336* (2013.01); *B29C 45/1671* (2013.01); *B29C 45/1676* (2013.01); *B29K 2021/003* (2013.01); *B29K 2105/0061* (2013.01); *B29L 2031/52* (2013.01)

(58) Field of Classification Search
CPC ............ A63B 2225/54; A63B 2225/50; A63B 2225/093; A63B 2220/833; A63B 2220/807; A63B 2220/806; A63B 2220/64; A63B 2210/50; A63B 2071/0694; A63B 2071/0675; A63B 2071/0655; A63B 2022/0092; A63B 21/072; A63B 2071/0625; A63B 2220/51; A63B 2220/17; A63B 2207/02; A63B 23/03508; A63B 23/03525; A63B 2210/58; B29C 45/14467; B29C 45/1671; B29C 45/1676; B29C 45/14336; B29L 2031/52; B29K 2105/0061; B29K 2021/003
See application file for complete search history.

(56) References Cited

U.S. PATENT DOCUMENTS

| | | | | |
|---|---|---|---|---|
| 3,497,214 | A * | 2/1970 | Kusznir | A63B 21/072 482/44 |
| 4,828,256 | A * | 5/1989 | Lee | A63B 21/0724 482/106 |
| 4,964,633 | A * | 10/1990 | Hymanson | A63B 21/027 482/110 |
| D321,733 | S | 11/1991 | Hymanson | |
| 5,147,262 | A * | 9/1992 | Hymanson | A63B 21/027 482/110 |
| 5,868,651 | A * | 2/1999 | Washington | A63B 21/00043 482/91 |
| 5,891,003 | A * | 4/1999 | Deac | A63B 21/027 482/106 |
| 6,293,893 | B1 * | 9/2001 | Truchelut | A63B 21/002 482/121 |
| 6,517,469 | B1 * | 2/2003 | Mercier | A63B 21/00043 482/121 |
| D517,135 | S * | 3/2006 | Klein | D21/679 |
| D517,148 | S * | 3/2006 | Renaud | D21/791 |
| 7,041,041 | B1 * | 5/2006 | Evans | A63B 21/0004 482/121 |
| 7,578,775 | B2 * | 8/2009 | Terry | A63B 21/0004 482/121 |
| 7,681,766 | B2 * | 3/2010 | Harrison, III | A45F 3/10 224/265 |
| 7,722,510 | B2 * | 5/2010 | Jhu | A63B 21/027 482/106 |
| D650,873 | S * | 12/2011 | Terry | D21/694 |
| 8,348,814 | B1 * | 1/2013 | Hinds | A63B 23/1218 482/82 |
| D722,347 | S * | 2/2015 | Matsushita | D21/662 |
| D728,039 | S * | 4/2015 | Groshek | D21/679 |
| D770,579 | S * | 11/2016 | Chang | A63B 21/4035 D21/691 |
| 9,656,120 | B1 * | 5/2017 | Franco | A63B 24/0003 |
| 9,931,558 | B2 * | 4/2018 | Horne | A63B 69/36 |
| 2002/0198476 | A1 * | 12/2002 | Chen | A61H 7/003 601/84 |
| 2003/0054925 | A1 * | 3/2003 | Burkhardt | A63B 21/026 482/92 |
| 2004/0242387 | A1 * | 12/2004 | Benach | A63B 21/026 482/126 |
| 2005/0233877 | A1 * | 10/2005 | Lin | A63B 21/026 482/126 |
| 2007/0090603 | A1 * | 4/2007 | Miletich | A63B 15/00 273/449 |
| 2007/0135275 | A1 * | 6/2007 | Oates | A63B 23/12 482/109 |
| 2008/0081747 | A1 * | 4/2008 | Mok | A63B 21/00185 482/121 |
| 2009/0280965 | A1 * | 11/2009 | Shapiro | A63B 69/06 482/72 |
| 2010/0240505 | A1 * | 9/2010 | Yang | A63B 21/00043 482/126 |
| 2011/0152044 | A1 * | 6/2011 | Klein | A63B 21/4043 482/110 |
| 2011/0201483 | A1 * | 8/2011 | Holleman | A63B 23/0488 482/122 |
| 2012/0010056 | A1 * | 1/2012 | Chang | A63B 23/03508 482/122 |
| 2012/0316040 | A1 * | 12/2012 | Hsu | A63B 21/027 482/110 |
| 2014/0106948 | A1 * | 4/2014 | Agostini | A63B 21/0555 482/129 |
| 2017/0120100 | A1 * | 5/2017 | Smith | A63B 21/4035 |

* cited by examiner

ISOKINETIC OSCILLATION EXERCISE DEVICE AND METHOD OF PRODUCING SAME

PRIORITY

This application claims priority to U.S. Provisional Application No. 62/360,270, entitled "ISOKINETIC OSCILLATION EXERCISE DEVICE," filed on Jul. 8, 2016, the entire disclosure of which is hereby incorporated by reference.

FIELD OF THE DISCLOSURE

The present disclosure relates generally to exercise apparatus and, more particularly, to an isokinetic oscillating exercise device and a method of manufacturing the device.

BACKGROUND OF THE DISCLOSURE

Isokinetic oscillation exercise devices have been used in the past as an excellent method of obtaining a full body workout.

Strength training is an essential fitness component for people of all ages, and muscle strengthening plays an important role in maintaining muscle mass and a person's ability to participate in daily activities. Muscle not only gives a body its shape, but muscle affects a person's resting metabolic rate (number of calories burned while at rest). Generally, people tend to lose strength and muscle mass due to inactivity, a sedentary lifestyle and/or the aging process.

The more people advance in age, the more strength plays an important role in several key functions, such as, for example, maintaining balance, preventing falls, and retaining bone density. Muscle loss is a condition that affects many older people, and has a major impact on an older adult's functional ability and quality of life.

Resistance training is a preferred method for increasing muscle mass, and thus, getting stronger. As a result, there many conventional resistance training tools that are commonly used to maintain and/or increase strength and muscle mass. A main criterion for strength improvement is to gradually increase the resistance that is placed on a muscle or muscle group, as said muscle becomes stronger.

Strength can be increased by use of a variety of different methods, including, but not limited to the use of isokinetic devices. However, while these methods can help increase strength, they also have certain shortcomings.

U.S. Pat. No. 4,964,633 by Hymanson discloses an isokinetic oscillating exercise apparatus. Hymanson discloses an isokinetic oscillating exercise apparatus which may be used to exercise different muscles by grasping by one hand or two hands centrally-located gripping portions attached to a blade and moving or shaking the blade back and forth causing the opposite ends of the blade to oscillate. The oscillation causes isokinetic exercising of a user's muscles. However, if a user lacks coordination, this device can be very difficult to oscillate.

U.S. Pat. No. 5,174,262 by Hymanson discloses a method for exercising using an isokinetic oscillating exercise apparatus. Hymanson discloses how to properly use an isokinetic oscillating exercise apparatus.

United States Publication No. 2012/329,616 by Theuer discloses a hand-held isokinetic exercise ring. Theuer discloses an isokinetic exercise ring which is comprised of two rigid concentric rings. The inner ring is large enough to fit over a user's shoulders and/or waist. The outer ring is approximately 150% larger in diameter than the inner ring. The two rings are strapped together with elastic cord. A user grasps either inner or outer ring on opposite sides and pulses the invention in and out or in a twisting motion. Pulsing in turn causes the ring not being grasped to oscillate. Oscillation can be achieved in front of, above, or around the user's body. By maintaining oscillation, the user will experience isokinetic exercise.

United States Publication No. 2015/141216 by Gvoich discloses a resistance training apparatus. Gvoich was concerned with a resistance training apparatus providing an elastic blade for use in exercise strength training and fitness conditioning. The resistance training apparatus provides a user with a more consistent and even resistance tension throughout an exercise movement.

However, there is a need for an isokinetic oscillation exercise apparatus that provides one or more advantages over current exercise apparatus such as: improved oscillation ability irrespective of user coordination, adjustability of frequency of oscillation, adjustability by a user adjustment to vary an intensity of a workout, improved ability of storage when not in use, and easier and more cost affordable manufacturability is desirable. All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The embodiment may seek to satisfy one or more of the above-mentioned desires. Although the present embodiment may obviate one or more of the above-mentioned desires, it should be understood that some aspects of the embodiment might not necessarily obviate them.

BRIEF SUMMARY OF THE DISCLOSURE

The present disclosure addresses and overcomes many if not all of the above-described drawbacks of difficulty of use, difficulty to oscillate, lack of adjustability, difficulty to store the device and difficulty to manufacture the exercising apparatus.

It is an object of the present disclosure to provide an isokinetic oscillating exercise apparatus which may be used for isokinetic exercising. The present disclosure aims to improve and overcome the drawbacks posed by other isokinetic exercise apparatus.

It is another object of the present disclosure to provide an isokinetic exercise apparatus that strengthens a user's muscles, increases power, agility, and core strength and improves a user's balance and coordination.

It is still another object of this invention to provide an isokinetic oscillating exercise apparatus which is of simple design and economical to manufacture.

In one embodiment, the isokinetic exercise apparatus can be reduced in size to a more compact device easily capable of being stowed, stored away or even packed for travel. In another embodiment, the apparatus is made of an elongated flexible blade with two end caps on each end, and a gripping portion in the middle of the elongated flexible blade. In some embodiments, the grip and end caps are made of a strong, resistant and easy to use material. The end caps may also be dual density end caps.

In various embodiments, the end caps may have a hole, a hook, a fork or any other alternative that can be used for alternative accessories such as lights, electronic repetition counter, force of oscillation calculator, a telemetry indicator showing how far the tips are flexing or other metrics, audio feedback device, a place to hang or store the device, or a place for additional accessories and attachments such as weights. The end caps may also contain a sensor chip, or incorporate additional storage options.

In various embodiments, the end caps and grip portion may be made of different materials, may be injection molded, injection co-molded, glued-on, or screwed on the elongated flexible blade. In one embodiment, the present disclosure may use simple fiberglass construction on an elongated flexible blade portion with an over molded grip. The ends may be comprised of a hard glass plastic center and a co-molded TPR outer ring. The over molded grip may be manufactured in two parts. The first part may be molded off of the elongated flexible blade and then slid on with an alignment fixture. The second part anchors the grip to the elongated flexible blade and seals against the first part. The second part may be comprised of material with a lower durometer for good flex and a tactile feel. The overmolded grip may be comprised of various materials and may have various shapes to facilitate comfort and tactile grip.

In one embodiment of the isokinetic oscillation exercise device, present disclosure can include various means of introducing a variable resistance. One embodiment may, for example, use a positional weighting system (PWS) to slide along the edge of the elongated flexible blade in order to create different oscillation speeds and variable resistance on the elongate flexible blade. The positional weighting system will allow for changes to the frequency of oscillation to make the workout easier or harder.

In another embodiment, the isokinetic oscillation exercise device can be used with a digital app. The app can play back or construct a workout with variations on time and intensity and may allow the ability to download new workouts from an online library. The app may also show movements, predict calorie burn based upon personal info and time and allow communication and interaction with an online community through challenges, goals and support.

In yet another embodiment, the isokinetic oscillation exercise device may be able to sense the intensity and frequency of workouts through either an add-on sensor, or an embedded sensor chip in the tip. In another embodiment, the sensor may be integrated with a positional weighting system. The sensor may also include a radio frequency identification (RFID) system to sync the sensed data with a digital app.

These and other objects and advantages are attained by an isokinetic oscillating exercise apparatus which may be used to exercise different muscles by grasping by one hand or two hands centrally-located gripping portions attached to an elongated flexible blade and moving or shaking the elongated flexible blade back and forth causing opposite ends of the elongated flexible blade to oscillate. The oscillation causes isokinetic exercising of a user's muscles. The gripping portions may be attached to the elongated flexible blade by adhesive, rivets, screws threaded into sleeves, or the like. The ends of the gripping portions may have curved surfaces which increase the effective lengths of the flexible portions of the elongated flexible blade on both sides of the gripping portions that are free to bend or oscillate. In addition, the gripping portions may be made out of wood and rubber portions attached together by adhesive.

Telescoping ends may be used to vary the length of the elongated flexible blade, or the oscillating range of the elongated flexible blade. The telescoping ends may be used to significantly reduce the overall length of the elongated flexible blade for ease in carrying the apparatus or for storage purposes. The telescoping ends may be small pipes which fit inside a large pipe (elongated flexible blade), flat elongated strips of metal that slide onto and engage with brackets attached to a flat elongated flexible blade, or foldable strips that help make the device more compact for storage.

The isokinetic oscillation device of the present disclosure can comprise an elongated flexible blade having a first and second end and a grip portion coupled to a middle portion of said elongated flexible blade; and one or more end caps coupled to said first and second end adapted to storage. In addition, when a user grasps the elongated flexible blade by the grip portion and shakes the elongated flexible blade, the elongate flexible blade generates an intermittent, cyclic or oscillating movement. The device can also comprise one or more end caps that can be shaped as hooks, hangers, or have circular ends and the user can use these ends to store or hang the device. These ends can also receive attachments such as weights, sensors or any other type of attachment.

To facilitate storage, the device can have an elongated flexible blade of being folded into a compact device. The elongated flexible blade can also comprise positional weighing system which slides along the elongated flexible blade to create various oscillation speeds and variable resistances. The device can also have sensors adapted to collect exercising data. These sensors can be stationary or can slide along the edge of the elongated flexible blade, and can have varying and adjustable features and resistances.

The present disclosure also discloses a method of manufacturing an isokinetic oscillation exercise device comprising the steps of: providing a flexible elongated blade with two opposite ends, a grip portion, two or more pliable rings, two or more end caps; injecting or placing two pliable rings on said elongated flexible blade separated by one length of said grip portion injection moldings; injecting the grip portion over the pliable rings; anchoring said grip portion to said elongated flexible blade and sealing it against the pliable rings; attaching end caps to said opposite ends of the elongated flexible blade.

The grip molding can be first injected over an elongated flexible blade then pliable ring moldings can be injected over the grip portion. In another embodiment, the pliable ring moldings can be injected or placed over the elongated flexible blade then the grip molding can be injected over the pliable ring moldings. The end caps can also have a skin (e.g., a color coating) and a core structure. In some cases, the skin structure can be first injected into a mold followed by a core structure injected to a mold and the skin structure can be injected again to encapsulate the core structure. The elongated flexible blade can be made of fiberglass.

In summary, a device or apparatus is disclosed using a blade capable of being oscillated can be used for isokinetic exercising the user's muscles may be exercised by grasping the device through the grip portion, and shaking the blade back and forth causing opposite ends of the blade to oscillate. The oscillating ends create a resistance against the user's grasp, thereby causing associated muscles to contract and relax numerous times. Such exercise strengthens a user's muscles, increases overall strength, agility and power. The use of the disclosed apparatus also helps a user increase muscle endurance and strength and improves a user's balance, core strength, muscle tone and overall stability of the user. Various exercises performed using the isokinetic apparatus work and strengthen various muscle groups.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENT

The invention and its various embodiments can now be better understood by turning to the following detailed description of the preferred embodiments, which are presented as illustrated examples of the invention. It is expressly understood that the invention may be broader than the illustrated embodiments described below.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use must be understood as being generic to all possible meanings supported by the specification and by the word itself.

The definitions of the words or elements therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements or that a single element may be substituted for two or more elements. Although elements may be described above as acting in certain combinations, it is to be expressly understood that one or more elements from a certain combination can in some cases be excised from the combination and that the combination may be directed to a subcombination or variation of a sub-combination.

The description will be made as to the embodiments of the present disclosure in conjunction with the accompanying FIGS. 1 through 14. In accordance with the purposes of this disclosure, as embodied broadly described herein, this disclosure in one aspect, relates to an isokinetic oscillation exercise device.

Advantageously, the isokinetic oscillation device of the present disclosure that has any or all of the following features: an improved central handle, more easily stored configuration, more efficient manufacturing, and adjustability to oscillate at different frequencies that adjusts to a user's strength and rhythm.

Figure 1:
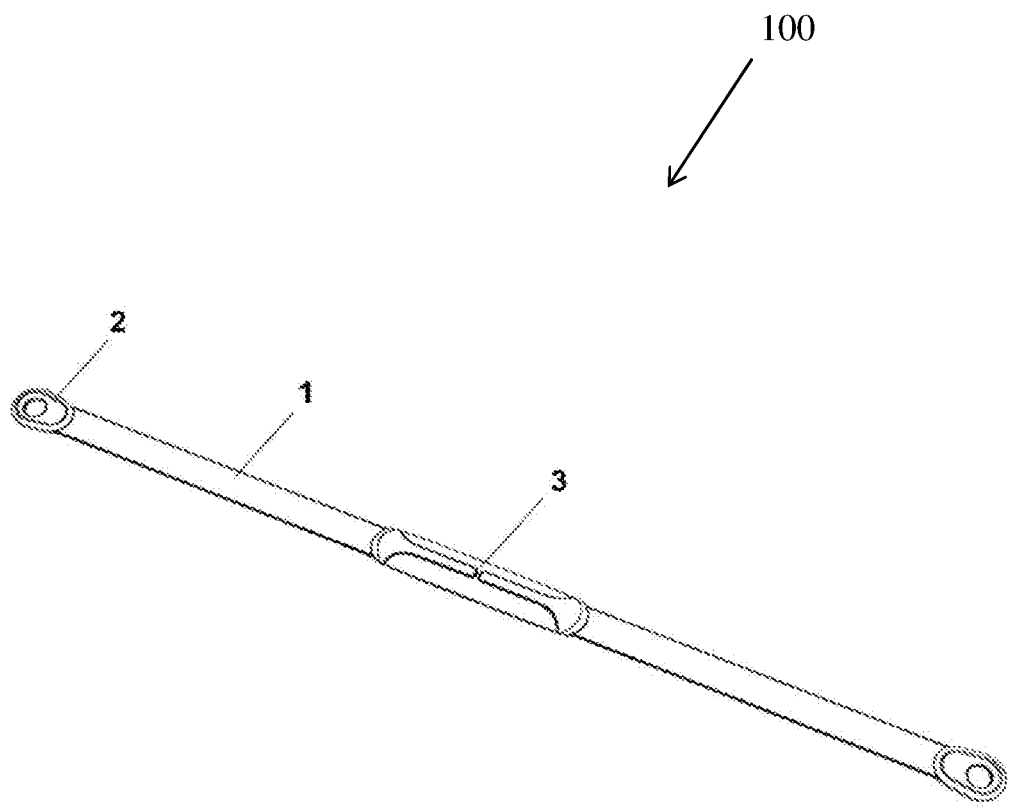
FIG. 1 is a top view of an embodiment of an isokinetic oscillation exercise device.

FIG. 1 shows an isokinetic oscillation exercise device 100 according to one embodiment of the disclosure. The isokinetic oscillation exercise device 100 has an elongated flexible blade 1 with a first and second end 2 and a grip portion 3 in the middle portion of the elongated flexible blade 1. In one embodiment, the ends of the elongated flexible blade 1 comprise end caps 2 which can be used for storage or stowing.

In some embodiments, the user grabs the elongated flexible blade 1 by the grip portion 3 and shakes it back and forth. Advantageously, this shaking back and forth causes generation by the elongated flexible blade 1 of an intermittent, cyclic or oscillating movement. Advantageously, different exercises can be performed with the isokinetic oscillation exercise device 100. The user can exercise various user muscles or user muscle groups. For example, the user muscles or user muscle groups can include one or more of the following and/or consist of one or more of the following: biceps, triceps, hips, buttocks, arms, stomach, neck, head, and legs, by grasping the isokinetic oscillation exercise device 100 with one hand or two hands centrally-located, on a middle portion thereof, and on grip portion 3 attached to an elongated flexible blade 1 and moving or shaking the elongated flexible blade 1 back and forth while moving the user muscles or the user muscle groups that is causing opposite ends of the elongated flexible blade 1 to oscillate. The oscillation causes isokinetic exercising of a user's muscles. The grip portion 3 may be attached to the elongated flexible blade 1 by or includes or consists of: friction, bracket, adhesive, rivets, screws threaded into sleeves, and/or the like. In addition, the grip portion 3 may be made out and/or constructed of natural or synthetic materials such as wood, composite materials, metals, plastics, fibers or a combination thereof and attached together by an adhesive.

Figure 10:
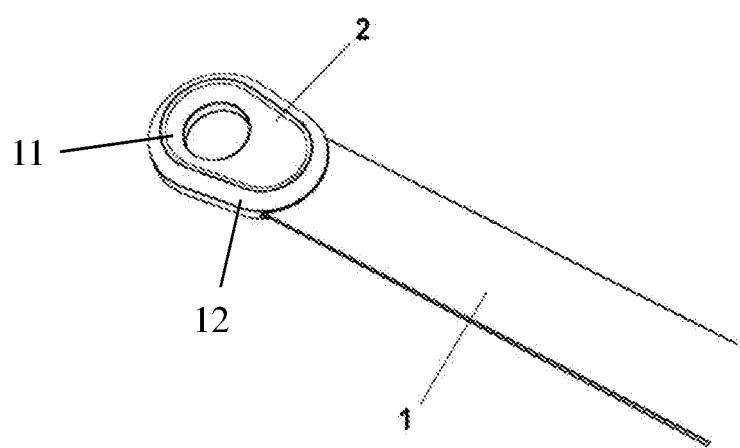
FIG. 10 is a close-up detailed view of a tip and end cap of an isokinetic oscillation exercise device.
Figure 11:
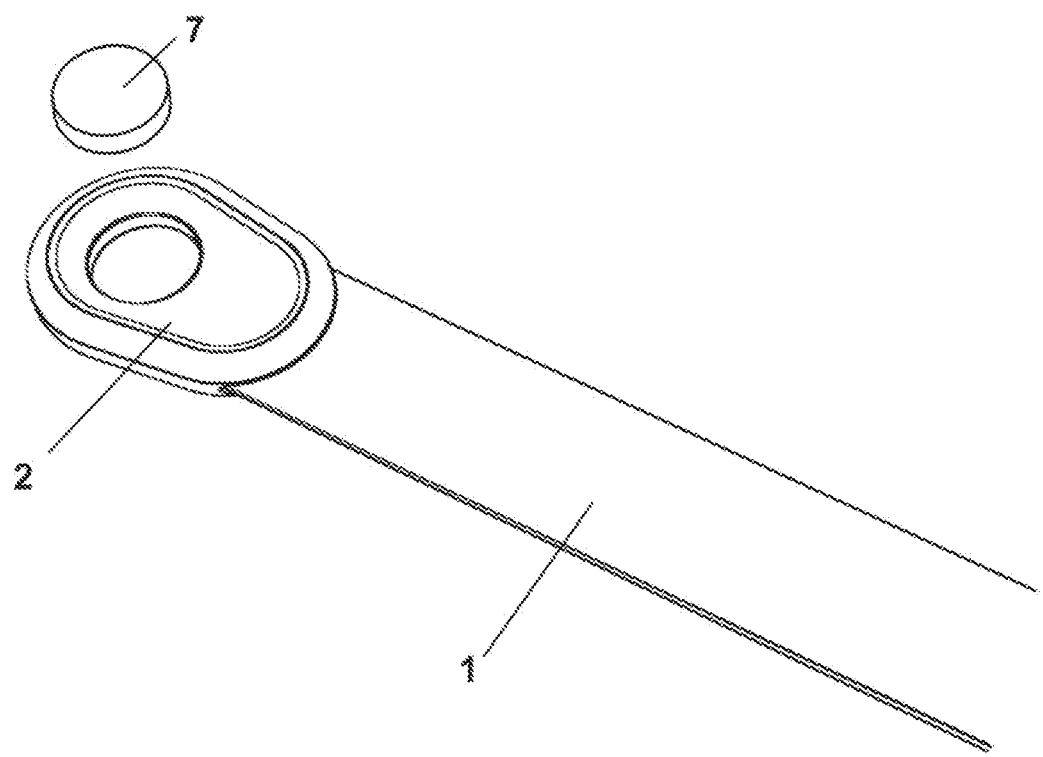
FIG. 11 is a close-up view of a tip, end cap and a sensor for an isokinetic oscillation exercise device.

In some embodiments, the end cap 2 can be in the shape of a hook, a circular end, e.g., as seen in FIGS. 1, 5, 8, 10-13, a hanger, a fork, a loop, an anchor shape, an arrow or any other shape capable of being hung or capable of receiving accessories or attachments. Some of accessories, e.g., attachments 7 (e.g., as illustrated in FIG. 11) can be any of the following or a combination thereof: lights, movement counters, force calculators, telemetry indicators, audio feedback, a camera, a mini computer, a hanger, and additional weights including kettle bells, or any other accessory capable of generating a weight resistance. In one example, the telemetry indicators can show how far the end caps 2 are flexing, the distance travelled by the ends of the elongated flexible blade, the calories burned, the power used throughout the exercise or any combination of metrics and exercise data. In yet another example, an audio feedback may produce a variable tone when it is time to change exercise or intensity of the workout, can play audio instructions for workouts and/or play music based on effort and intensity. In other embodiments, the music and the intensity of the exercise (cadence, power, resistance, speed of oscillation) can vary with the music to the beats per minutes. In another example, the device resistance, position of weights and speed oscillation can change with the music.

In one embodiment, the end cap 2 can be comprised of an inner 11 and outer part 12 with a hollow ring. The exercise device 100 may be hung by the hollow ring, thereby facilitating easier storage of the exercise device. In yet another embodiments, FIG. 5, 8, 10-13 show where the tip is comprised of smoothed, hard plastic.

In various embodiments, the two different components of the end caps 2 (i.e., inner 11 and outer part 12) and grip portion 3 (e.g., first-shot of flexible elastomer that acts as a gasket for a second-shot, and a second-shot gel TRP grip fills the cavities and locks the blade in place) may be made of different materials, may be injection molded, injection co-molded (e.g., two materials are molded together to form one part, i.e., the end caps 2 and the grip portion 3), glued-on, or screwed on the elongated flexible blade 1. In yet another embodiment the end cap can be comprised of smoothed hard plastic.

Figure 8:
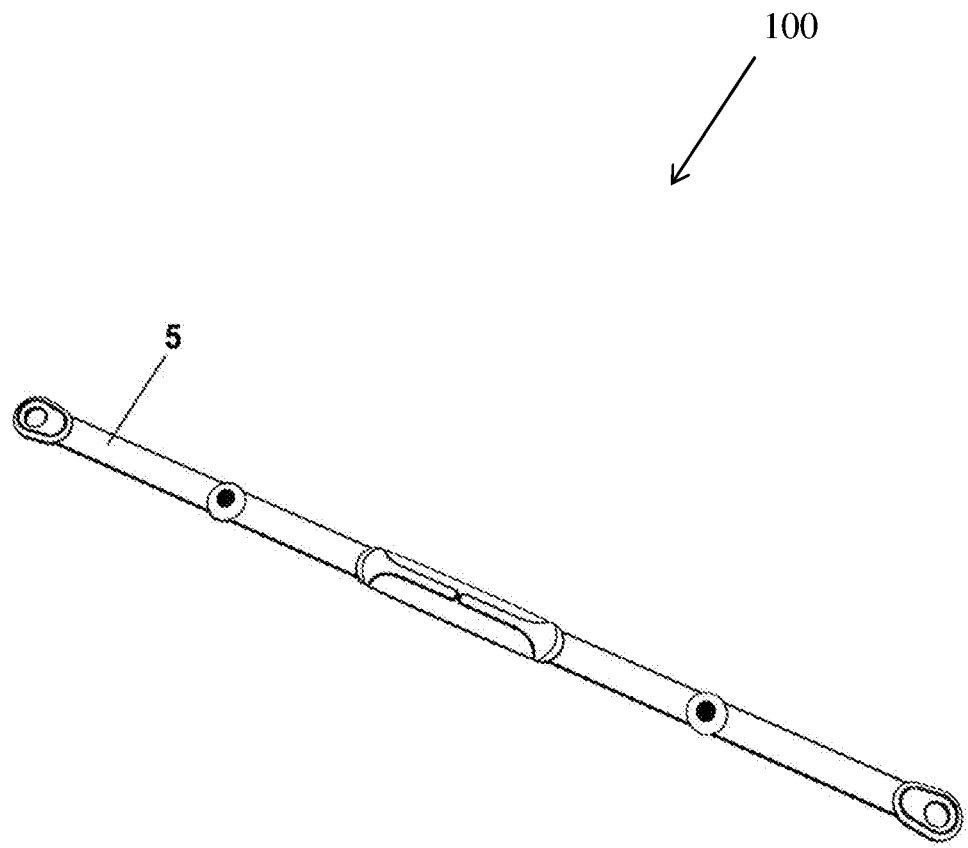
FIG. 8 is a view of one embodiment of a folding isokinetic oscillation exercise device.
Figure 9:
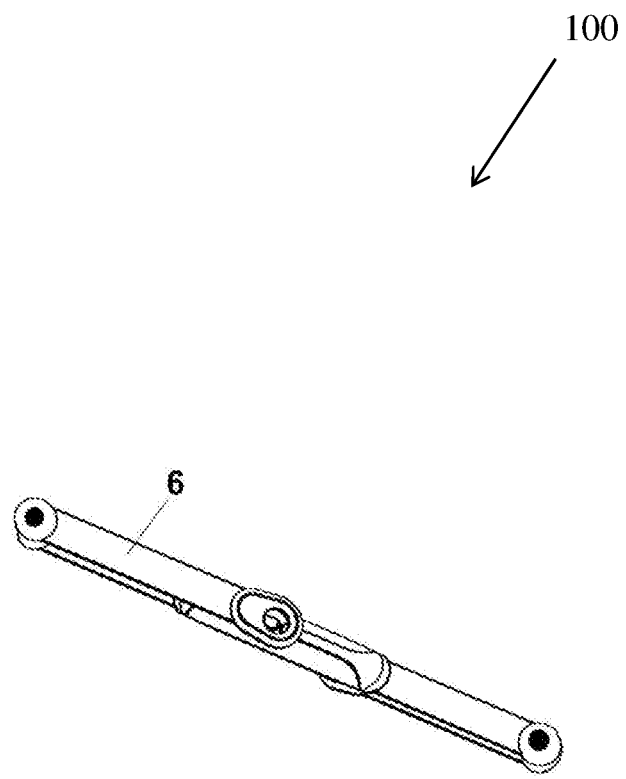
FIG. 9 is a view of one embodiment of a folded isokinetic oscillation exercise device of FIG. 8.

FIG. 8 shows an embodiment of the isokinetic oscillating device 5 capable of being folded in to a more compact device 6 (as illustrated in FIG. 9). The isokinetic oscillating device 5 can either be folded into a more compact device for stowing, storage or travel as shown in FIG. 9. In yet another example, the isokinetic oscillating device 5 or elongated flexible blade can have one or more telescoping ends, e.g., extending or contracting portions of elongated flexible blade 1 or the folding portions (see FIG. 9), to vary the length of the elongated flexible blade 1.

Advantageous, by varying a length, i.e., adjusting amount of isokinetic oscillating device 5 available for oscillation, the telescoping ends can also be used to change the oscillating range, e.g., frequency of oscillation of 1.5 Hz for 1 inch of oscillating range or 2 Hz for 2.5 inches of movement of the elongated flexible blade 1 of the isokinetic oscillating device 5. Advantageously, these telescoping ends or portions that can be folded, i.e., incorporated as part of the elongated flexible blade 1, may be used to significantly reduce the overall length of the elongated flexible blade 1 for ease in carrying or for storage purposes. For example, the telescoping ends may be small pipes which fit inside a large pipe (elongated flexible blade 1), flat elongated strips of metal that slide onto and engage with brackets attached to a flat elongated blade 1, or foldable strips of the elongated flexible blade 1 that help make the device more compact for storage.

Figure 12:
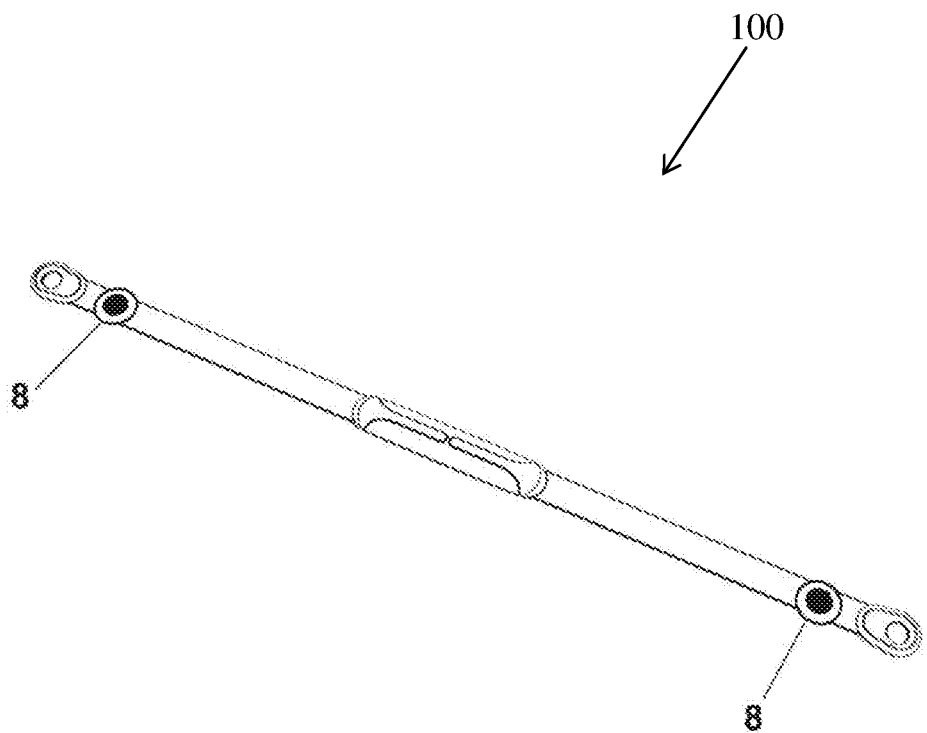
FIG. 12 is a view of an isokinetic oscillation exercise device and a sliding weight on the device.
Figure 13:
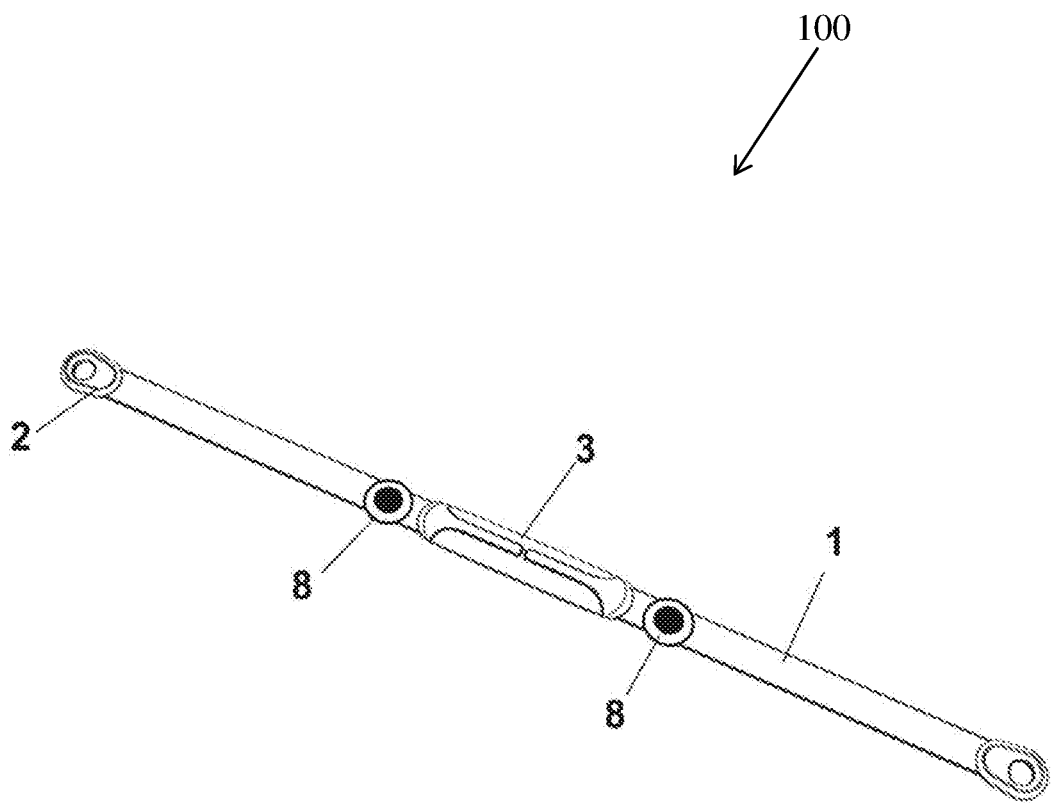
FIG. 13 is a view of another embodiment of the isokinetic oscillation exercise device with a sliding weight on the device.
Figure 14:
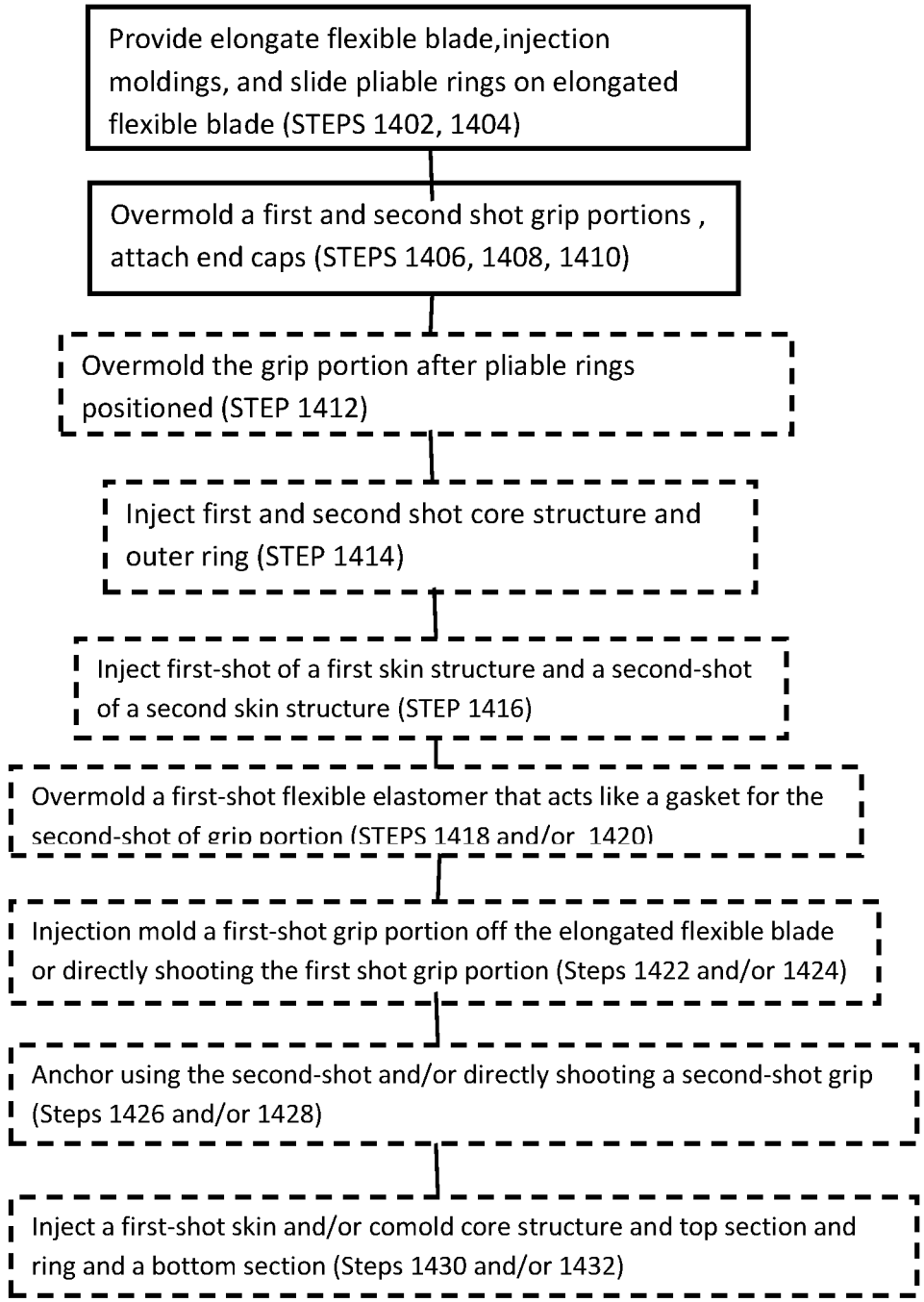
FIG. 14 is a method of manufacturing the isokinetic oscillation exercise device in accordance with embodiments disclosed in FIGS. 1-13.

FIGS. 12-13 show an embodiment of an isokinetic oscillation exercise device and sliding weights 8 on the isokinetic oscillation exercise device. In the embodiment of FIG. 12-13, the sliding weights 8 can be slid throughout the elongated flexible blade 1 to vary the speed of oscillation of the elongated flexible blade 1. In particular embodiment in reference to FIG. 12, the double placement of the sliding weights 8 is coupled to dual density end caps 2. In one embodiment, when the sliding weights 8 are placed further away from the grip portion 3 and closer to the ends 2 of the elongated flexible blade 1, the speed of oscillation is reduced. In contrast as illustrated in FIG. 13, whereas when the sliding weights 8 are closer to the grip portion 3 and away from the ends 2 of the blade 1, the elongated flexible blade 1 oscillates faster. The position of the positional and sliding weighing system helps create various oscillation speeds and variable resistances for exercise.

In one embodiment of the isokinetic oscillation exercise devices as illustrated, most notably in FIGS. 12-13, the present disclosure can include various means of introducing a variable resistance. One embodiment may, for example, use a positional weighting system (PWS), e.g., the sliding weights 8, to slide along and affixed to the edge of the elongated flexible blade 1 in order to create different oscillation speeds and variable resistance on the elongated flexible blade 1. The positional weighting system will allow for changes to the frequency of oscillation to make the workout easier or harder. For example, the positional weighting system (PWS) are slide or connected to, e.g., affixed to via a bracket, screw, clip, friction between the sliding weights 8 and the elongated flexible blade 1, one portion of the elongated flexible blade 1, e.g., one quarter to one half distance from the center portion of the elongated flexible blade on both sides thereof, to create a smaller range of motion, e.g., about 1.0 inches of movement of the elongated flexible blade 1 that equates to a 1.5 Hz oscillation frequency. For example, the positional weighting system (PWS) are slide or connected to one portion of the elongated flexible blade 1, e.g., affixed or coupled to about three quarters to seven eights distance from the center portion of the elongated flexible blade 1 on both sides thereof, to create a larger range of motion, e.g., about 2.5 inches of movement of the elongated flexible blade that equates to a 2.0 Hz oscillation frequency.

Advantageously, by slowing down the elongated flexible blade 1, i.e., larger range of motion of the elongated flexible blade 1, e.g., 2.5 inches, this will make the workout with the elongated flexible blade 1 easier for the beginner user. Advantageously, by speeding up the elongated flexible blade 1, i.e., smaller range of motion of the elongated flexible blade 1, e.g., 1.0 inches, this will make the workout with the elongated flexible blade more difficult. Advantageously, by slowing down the elongated flexible blade 1, i.e., larger range of motion of the elongated flexible blade 1, it will make is easier for beginner users when doing hip and thigh sculptor exercise by allow the elongated flexible blade 1 to change directions in a slower way to help avoid coordination issues. Advantageously, larger range of motion of the elongated flexible blade 1, lowers the frequency to make the workout easier. Advantageously, larger range of motion of the elongated flexible blade 1, lowers the frequency to allow users to use the product more effectively, i.e., full range of the body part motion and proper rhythm for user muscle and user muscle groups, e.g., hips, legs, thighs, arms, buttocks, back, upper legs, lower legs, ankles, stomach, wrists, and hands. Advantageously, by having different range of motion, i.e., smaller range of motion of the elongated flexible blade 1 and larger range of motion of the elongated flexible blade 1, this will give more variety to the workout by a beginner, intermediate, or an advanced user so that users can oscillate the elongated flexible blade 1 at a proper rhythm. Advantageously, the slowing of the elongated flexible blade, i.e., a larger range of motion of the elongated flexible blade 1, this will allow more users to user the elongated flexible blade more effectively to achieve their goals of moving, performing, feeling better and make our product differentiate from competitors.

In another embodiment, the isokinetic oscillation exercise device 100 can be used with a mobile software application, e.g., stored on a mobile device like a mobile phone, that transmits and receives information wireless and can download measured collected information, e.g., predicted calorie count, exercise time, frequency of oscillation, number of minutes of constant motion, length of motion covered by the oscillation from start of workout to beginning of workout from accessories 7. In one example, the mobile software application can play back or construct a workout with variations on time and intensity and may allow the ability to download new workouts from an online library. The mobile software application may also show movements, predict calorie burn based upon personal info and time and allow communication and interaction with an online community and improve a user's usage of the isokinetic oscillation exercise device 100 through challenges, goals and support.

In one or more embodiments, the accessories 7 can be a mini/micro computer module, e.g., programmed chip in a plastic housing, can also be added either on the end caps 2 or along the elongated flexible blade 1. In one example, the micro/mini computer module can identify the user, and record exercise data such as calories burned, intensity, frequency of oscillation, or other exercise metrics. The user can have a specific account on the isokinetic oscillation exercise device, such as that when a different user uses the device, the other user can log on to the device. A community of users can be joined either through the mobile software application or through an online site, where the data collected from the exercise is reported to that platform.

Various videos for exercises can be followed by a user either through the app or through an online site and a library of pre-recorded and live streaming exercises is available to choose from. In one scenario, the user can compete against friends by logging their exercise data through the app or site. Exercising data can also be automatically and in real time streamed to the online or app platform, allowing the user to not only log data in real time, but also be able to see other user's performances in the community, allowing the users to complete against one another in real time.

In yet another embodiment, advantageously the isokinetic oscillation exercise device 100 may be able to sense the intensity and frequency of workouts through either an add-on sensor, or an embedded sensor chip in the end caps 2. In another embodiment, the sensor may be integrated with a positional weighting system. The sensor may also include a radio frequency identification (RFID) system to sync the sensed data with a digital app.

FIGS. 10 and 11 show a detailed view of one end cap embodiment. FIG. 10 shows an end cap on an elongated flexible blade and FIG. 11 shows the same but with an adaptable sensor 7 capable of collecting data exercise. The sensor 7 can either be stationary and placed on the end cap 2 or along the device, or can be a moving sensor along the device. In another embodiment, the moving or sliding sensor can slide along an edge of the elongated flexible blade and can help adjust the resistance and oscillating rate of the device.

Figure 4:
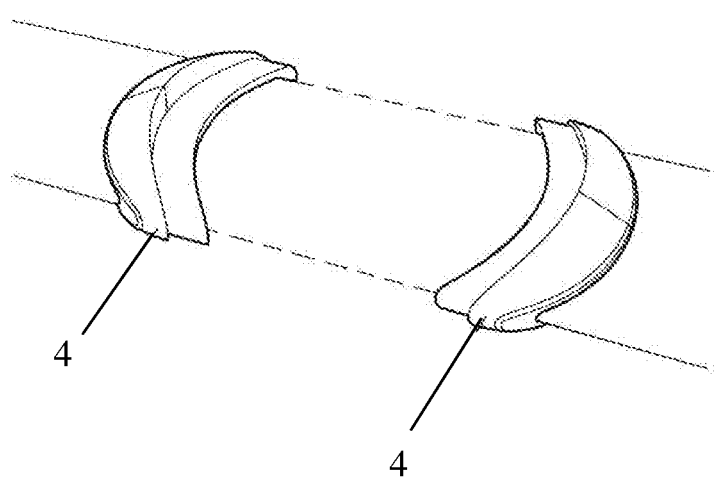
FIG. 4 is a close-up detailed view of placed pliable ring on an embodiment of the isokinetic oscillation exercise device.
Figure 5:
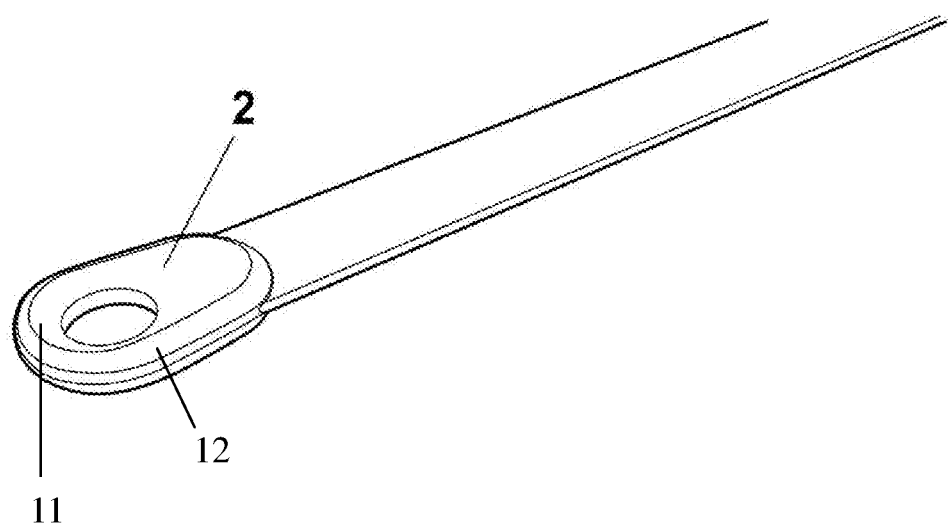
FIG. 5 is a close-up view of an embodiment of the pliable ring of the isokinetic oscillation exercise device.
Figure 6:
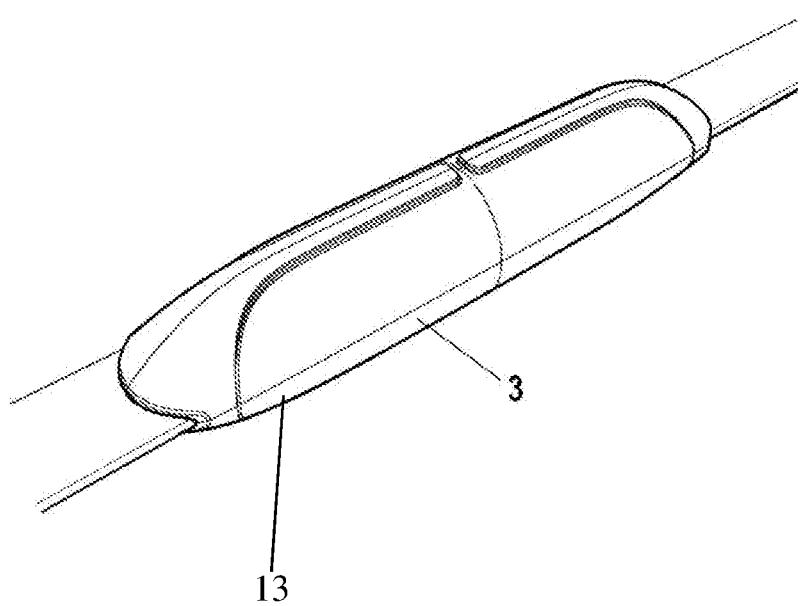
FIG. 6 is a close-up view of another embodiment of the grip portion of the isokinetic oscillation exercise device.
Figure 7:
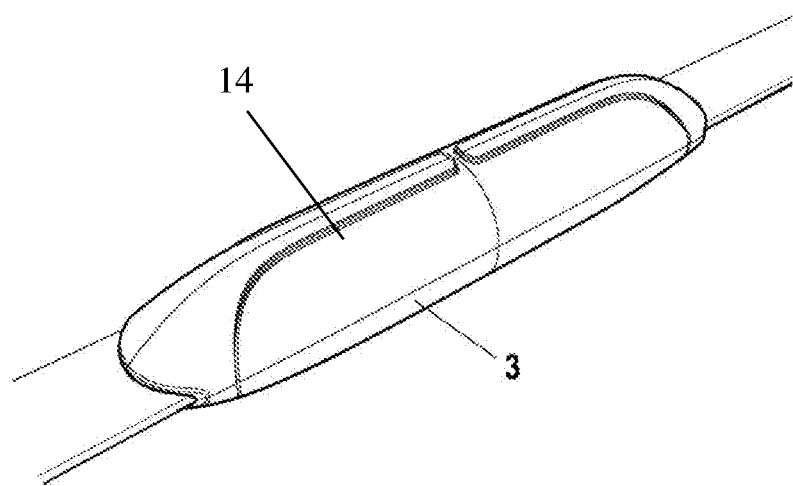
FIG. 7 is a duplicate of FIG. 6 with emphasis on the top section of the grip portion of the isokinetic oscillation exercise device.

FIGS. 1 to 7 show different embodiments of grip portion and end caps manufactured in various ways. In one embodiment, the isokinetic oscillation exercise device 100 can be made by first having a pre-cut flexible elongated flexible blade 1 with two opposite ends, then placing two pliable rings 4 onto the elongated flexible blade 1 as shown in FIGS. 6-7. The two pliable rings 4 helps preset the area where the grip portion 3 will then be molded onto. The grip portion 3 is then injected over the pliable rings 4 and anchored onto the isokinetic oscillation exercise device 100.

Advantageously, this helps seal the grip portion 3 over the pliable rings 4 or "calamari" rings 4 and avoid having to cut the ends of the grip portion 3; thus, this elimination of cutting of the ends prevents the elongated flexible blade 1 being cut, nicked, or abraded in so as to maintain an integrity level of the material properties of the elongated flexible blade 1. Advantageously, the end caps 2 can be attached to the elongated flexible blade 1 after the pliable rings 4 are slid into the elongated flexible blade 1. In another embodiment, the grip portion 3 can be first-shot, e.g., acts as a gasket for the second-shot gel TPR (ThermoPlastic Rubber) grip that fills in cavities of the first-shot and locks the first-shot onto the elongated flexible blade 1, then advantageously, the pliable rings 4 injection molded on top of the grip portion 3 anchoring and sealing the grip portion 3 into place.

In one embodiment, the end caps 2 can be attached to the elongated flexible blade 1 by first injecting the end cap outer ring to the edge of the elongated flexible blade, and then the end cap core structure is injection-molded onto the end cap outer ring. This step is then followed by injection-molding the outer ring one more time on the core structure to encapsulate all the layers.

The elongated flexible blade 1 can be made from various materials. In one embodiment, the elongated flexible blade 1 is made of fiber, fiberglass. In another embodiment, the elongated flexible blade 1 can be particularly made with pultruded fiberglass with silk screened messages or logo on the elongated flexible blade 1. Here, pultrusion is a continuous molding process whereby reinforcing fibers are saturated with a liquid polymer resin and then carefully formed and pulled through a heated die to form a part. Pultrusion results in straight constant cross section parts of virtually any shippable length.

In one embodiment, the present disclosure may use simple fiberglass construction on the flexible portion, i.e., the portion that is not the overmolded portion of the grip portion, of the elongated flexible blade 1. As seen in FIGS. 4 and 5, the end caps 2 may be comprised of a hard gloss plastic center 11 and a co-molded TPR (Thermoplastic) outer ring 12, i.e., both the hard plastic center (the core structure 11) and the TPR outer ring are co-molded, i.e., two different parts molded together to form one part, i.e., end caps 2. Advantageously, each of the hard gloss plastic center (i.e., the core structure 11) and the TPR outer ring 12 may have different colors and/or different materials and can be co-molded together.

Figure 2:
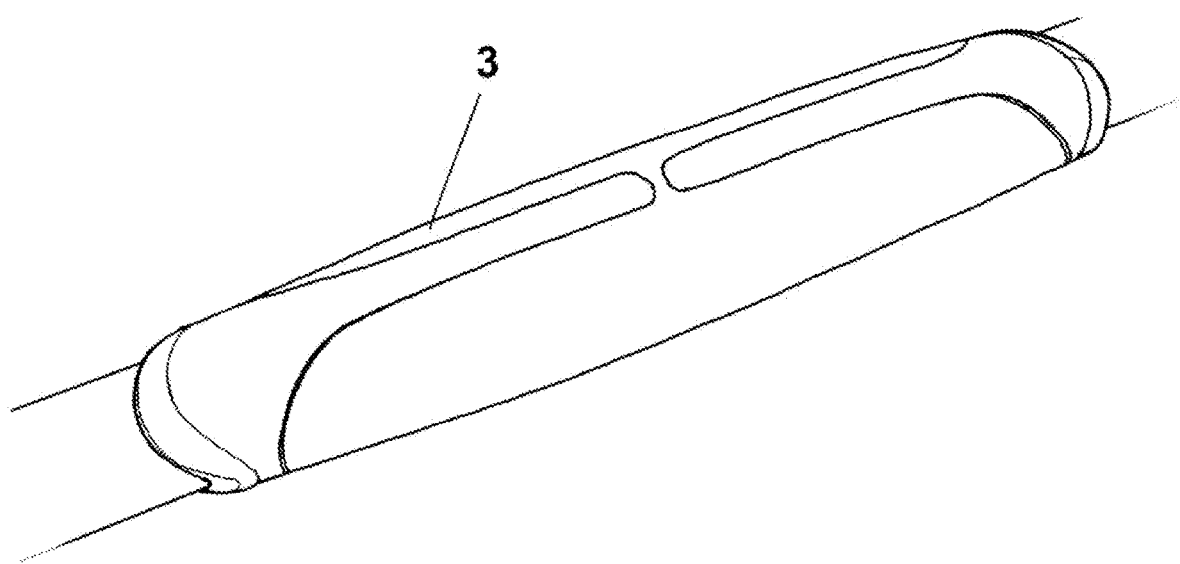
FIG. 2 is a close-up view of an embodiment of grip molding placed on an isokinetic oscillation exercise device.
Figure 3:
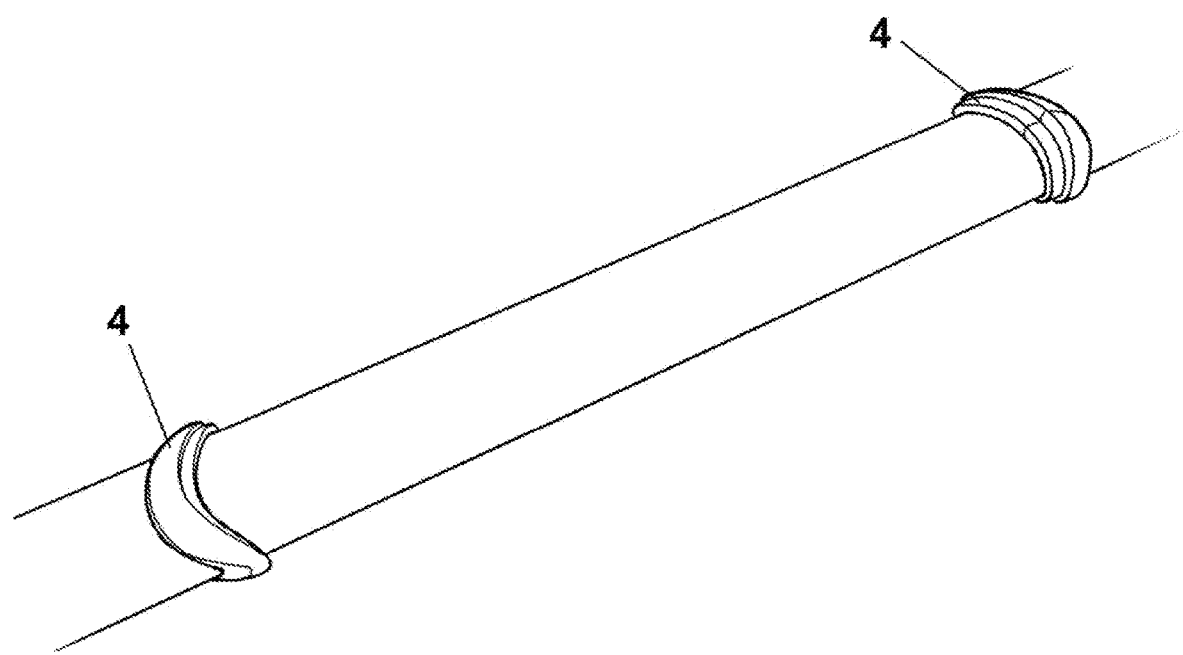
FIG. 3 is a close-up view of an embodiment of a pliable ring placed on an isokinetic oscillation exercise device.

In one embodiment, the grip portion 3 may be manufactured in two parts (see FIG. 2, assembled grip portion 3). The first part may be molded off of the elongated flexible blade 1 and then slid on with an alignment fixture (see FIG. 6, bottom section 13 of the grip portion 3). The second part anchors the grip portion to the elongated flexible blade 1 and seals against the first part (see FIG. 7, top section 14 of the grip portion 3). FIG. 2 shows the two different parts of an over molded grip and how they may fit together in one embodiment. The second part may be comprised of material with a lower durometer for good flex and a tactile feel. The grip portion (overmolded grip) may be comprised of various materials and may have various shapes to facilitate comfort and tactile grip as seen in FIGS. 1-13.

The method includes the following steps:
provide an elongated flexible blade with two opposite ends, grip portion injection moldings, two or more pliable ring injection moldings, and a first and second end caps injection moldings (step 1402);

slide two or more pliable rings on the elongated flexible blade separated by a length of a grip portion (step 1404);

overmold a first-shot of the grip portion over the two or more pliable rings (step 1406);

overmold a second-shot of the grip portion to the elongated flexible blade and seal it against the two or more pliable rings (step 1408); and attach first and second end caps to the opposite ends of the elongated flexible blade (step 1410).

Step 1412 through 1432 are optional steps (highlighted in dotted lines in FIG. 14) that may or may not be utilized in the method.

In step 1412, overmold the grip portion over the elongated flexible blade after the two or more pliable rings are independently positioned on a flexible portion of the elongated flexible blade.

In step 1414, inject a first-shot of a core structure and a second-shot of an outer ring; and form the first and the second end caps.

In step 1416, inject a first-shot of a first skin structure on the core structure of the first and the second end caps; followed by injecting a second-shot of a second skin structure on the outer ring; and form the first and the second end caps.

In step 1418, overmold a first-shot of the grip portion over the one or more pliable rings includes overmold a first-shot flexible elastomer that acts like a gasket for the second-shot of the grip portion.

In step 1420, overmold a second-shot of the grip portion to the elongated flexible blade and sealing against the first-shot of the grip portion against the one or more pliable rings includes inject a second-shot gel of the grip portion that fills in cavities of the first-shot of the grip portion and locks the elongated flexible blade in place.

In step 1422, overmold a first-shot of the grip portion over the one or more pliable rings including injection molding a first-shot of the grip portion off the elongated flexible blade and then the first shot of the grip portion slides on with an alignment fixture thereto.

In step 1424, overmold a first-shot of the grip portion over the one or more pliable rings includes directly shooting by injection molding a first-shot of the grip portion on a top of the elongated flexible blade.

In step 1426, overmold a second-shot of the grip portion to the elongated flexible blade and sealing it against the one or more pliable rings includes overmold a second-shot of the grip portion, anchoring using the second-shot of the grip portion the first-shot of the grip portion to the elongated flexible blade; and sealing the grip portion against the one or more pliable rings.

In step 1428, overmold a second-shot of the grip portion over the one or more pliable rings includes directly shooting by injection molding a second-shot of the grip portion on a bottom of the elongated flexible blade.

In step 1430, inject a first-shot of a skin structure on the first-shot of the grip portion; and afterwards, inject a second-shot of a skin structure on the second-shot of the grip portion; and provide an elongated flexible blade having two opposing ends includes constructing of fiberglass an elongated flexible blade having two opposing ends.

In step 1432, co-mold a core structure and a top section of the grip portion in a first-shot injection molding; remove a top portion from a tool of a first mold; align a second mold indexed off the first mold; and co-mold a ThermoPlastic Rubber (TFR) ring and a bottom section of the grip portion in the second-shot injection molding. In one addition or in the alternative, in step 1432, slide a positional weighing system along the elongated flexible blade; and create various oscillation speeds and variable resistances; wherein sliding the positional weighting system includes sliding weights along the elongated flexible blade to adjust a level of difficultly for oscillation when exercising various muscles or muscle groups.

As illustrated in above method steps, the hard gloss plastic center (the core structure) and the top section of the grip portion 3 are molded in a first-shot injection molding and after a top portion from a tool of a first mold is removed, an alignment of a second mold is indexed off the first mold so that a second-shot injection molding of TFR ring and the bottom section of the grip portion 3 are molded in the second-shot injection molding.

Advantageously, as illustrated in above method steps, various techniques can be used in manufacturing the present disclosure. In one embodiment, a two-shot injection molding is used for both the end caps 2 (e.g., first-shot: hard plastic gloss grey for the inside portion of the end caps 2, e.g., tips 2); second-shot: soft black matte black for outer portion of the end caps 2, e.g., outer ring 12) and the grip portion 3 (e.g., first-shot is molded off of the elongated flexible blade 1. In one further example, a soft plastic matte black color, for the top of the hand grip that slides on and aligns, e.g., with an alignment fixture, with elongated flexible blade 1, and second-shot: soft plastic matte grey for the back of the grip portion anchors the grip portion 3 to the elongated flexible blade 1 and seals against the first-shot plastic injection molding on either one of those components. The 2-shot injection molding process might consist of producing two or more components injection molded from different materials in one process quickly and efficiently.

Advantageously, the components, for example end caps 2 and grip portion 3, can be made with the two-shot injection molding, co-injection, multi-component molding, or any other variation of advanced molding technologies.

Advantageously, hard materials can be combined with soft materials, a two step process can be performed during a single press machine, or components can be consolidated to eliminate additional assembly costs.

Advantageously, the technology of injection molding continues to become increasingly sophisticated. Up-to-date fabrication technology allows processors to produce injection molded parts from two different materials. By combining these different materials with the ever-improving molding technology, complex functional parts can now be produced economically and efficiently in massive quantities.

Advantageously, the materials may differ in polymer type and/or hardness, and can be fabricated from molding techniques such as dual injection molding, two-shot molding, two-color molding, two component molding and/or multi-shot molding. For example, for the hand grip 3, first-shot molding is gloss white and manufactured away from the elongated flexible blade, and second-shot molding is translucent blue for good flex/tactile feel. Whatever its designation, a sandwich configuration has been made in which two or more polymers are laminated to take advantage of the properties each contributes to the structure.

Advantageously, the two-shot plastic injection molding process can be done with a machine with two independent injection units, each of which shoots different material. The first material is injected through a primary system, as in a normal injection molding cycle. During the injection, the mold volume to be occupied by the second material is shut off from the primary runner system. The mold is then opened and the core plate rotated 180 degrees. The mold is again closed and the secondary runner system is connected to the volume to be filled. After sufficient part cooling, the mold is opened and the part is ejected.

Advantageously, the two-shot process can also be accomplished with an indexing system (a round table rotating around a horizontal axis) with a primary and secondary station. While the first injection is accomplished at the first station, the second injection is accomplished at a second station. Each injection station is run by an independent injection unit. This allows injection speeds and pressures to be controlled for each material being utilized. These manufacturing methods allow for savings in cost of production, help simplify the manufacturing process, enhance the feel and look of the final product and allow for a very soft hand grip that will not hurt the user's limb during exercise. This manufacturing method not only helps making the handle and end caps softer, but it also allows for a multi-colored design, sweat shield protection during exercise, movable segments and components, drop protection, and helps integrate backlit buttons and other components. The two-shot injection molding process also helps with vibration, noise dampening, oscillation dampening and isolation.

This manufacturing process requires that the two materials be compatible (chemically similar), or no bonding occurs. Standard grades of Santoprene TPV bond to polypropylene, some polyethylenes and some TPOs. Nylon-bondable (PA series) grades bond to nylon-6 with a variety of fillers, and to some blends of nylon 6/6. Specialty grades also exist that bond to ABS, polycarbonate, polystyrene, EPDM and metals.

Another manufacturing process that can be used in the making of the isokinetic oscillating device grip 3 and end caps 2 is the co-injection molding process. This process produces a component with a skin and core laminated structure. The skin material is firstly injected in the mold, and then followed by a core material. The machine then injects the skin material again to encapsulate the core. A final product can then have the desired appearance of the outside material.

The present disclosure includes improvements on other isokinetic oscillation exercise devices. Previous oscillating exercise devices may have had rubber grips and tips that generated bad odors after a few times of use and after the user sweat on the grip. The current disclosure uses sweat proof materials on both the tips and the grips. These materials do not produce bad odors even after a sustained period of use. For example, the sweat proof materials include materials that repel sweat, water and liquid such as superhydrophobic coatings.

Thanks to the ease of use and adjustability of the new product, the device can be used for physical therapy patients and people at various ages and fitness levels. The exercise device is also adjustable to variable levels, and speeds of oscillation and resistance. The exercise device can also be personalized by adding various attachments and accessories to it, such as weights, a sliding or stationary sensor or other sliding positional weighing systems to increase or decrease the intensity of the workout and match the fitness level of the user.

Thus, specific embodiments and applications of isokinetic oscillating devices have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements or components in a non-exclusive manner, indicating that the referenced elements or components, may be present, or utilized, or combined with other elements or components, that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. An isokinetic oscillation exercise device comprising:
   an elongated flexible blade having a first terminal end, a second terminal end disposed opposite to said first terminal end, and a grip portion coupled to a middle portion of said elongated flexible blade; and
   a first end cap and a second end cap respectively coupled to the first terminal end and the second terminal end;
   wherein said elongated flexible blade has a flattened profile, and each of said first and second end caps has a circular end;
   wherein said circular end of each of said first end cap and second end cap has a through-opening forming a through-channel, and the through-channel has a channel axis that is substantially perpendicular to a longitudinal axis of the elongated flexible blade;
   and
   wherein the elongated flexible blade generates an intermittent, cyclic or oscillating movement responsive to a user grasping the elongated flexible blade by the grip portion and shakes the elongated flexible blade.

2. The device as recited in claim 1, wherein the elongated flexible blade includes a positional weighing system that is capable of being slide along the elongated flexible blade and creates various oscillation speeds and variable resistances.

* * * * *